(12) United States Patent
Yassa

(10) Patent No.: US 9,892,733 B2
(45) Date of Patent: Feb. 13, 2018

(54) METHOD AND APPARATUS FOR AN EXEMPLARY AUTOMATIC SPEECH RECOGNITION SYSTEM

(71) Applicant: Speech Morphing Systems, Inc., Campbell, CA (US)

(72) Inventor: Fathy Yassa, Soquel, CA (US)

(73) Assignee: SPEECH MORPHING SYSTEMS, INC., Campbell, CA (US)

( * ) Notice: Subject to any disclaimer, the term of this patent is extended or adjusted under 35 U.S.C. 154(b) by 0 days.

(21) Appl. No.: 14/283,037

(22) Filed: May 20, 2014

(65) Prior Publication Data

US 2014/0343940 A1 Nov. 20, 2014

Related U.S. Application Data

(60) Provisional application No. 61/825,516, filed on May 20, 2013.

(51) Int. Cl.
| | |
|---|---|
| G10L 15/26 | (2006.01) |
| G10L 15/00 | (2013.01) |
| G06F 17/27 | (2006.01) |
| G10L 15/32 | (2013.01) |
| G10L 15/183 | (2013.01) |

(52) U.S. Cl.
CPC ............ *G10L 15/26* (2013.01); *G06F 17/275* (2013.01); *G10L 15/00* (2013.01); *G10L 15/005* (2013.01); *G10L 15/183* (2013.01); *G10L 15/32* (2013.01)

(58) Field of Classification Search
None
See application file for complete search history.

(56) References Cited

U.S. PATENT DOCUMENTS

| | | | | |
|---|---|---|---|---|
| 6,085,160 A | * | 7/2000 | D'hoore | G09B 19/06 704/2 |
| 7,228,275 B1 | * | 6/2007 | Endo | G10L 15/32 704/231 |
| 2005/0010422 A1 | * | 1/2005 | Ikeda | G10L 15/30 704/277 |
| 2012/0143591 A1 | * | 6/2012 | Deng | G06F 17/2818 704/2 |
| 2012/0215539 A1 | * | 8/2012 | Juneja | G10L 15/30 704/254 |
| 2012/0271631 A1 | * | 10/2012 | Weng | G10L 15/063 704/243 |
| 2013/0132089 A1 | * | 5/2013 | Fanty | G10L 21/00 704/270 |
| 2013/0238336 A1 | * | 9/2013 | Sung | G10L 15/32 704/255 |
| 2014/0180689 A1 | * | 6/2014 | Kim | G10L 15/32 704/246 |

(Continued)

OTHER PUBLICATIONS

Aggarwal et al ("Integration of multiple acoustic and language models for improved Hindi speech recognition system", Int J. Speech Technol. Feb. 2012).*

(Continued)

*Primary Examiner* — Paras D Shah
*Assistant Examiner* — Yi-Sheng Wang
(74) *Attorney, Agent, or Firm* — Sughrue Mion, PLLC

(57) ABSTRACT

An exemplary computer system configured to user multiple automatic speech recognizers (ASRs) with a plurality of language and acoustic models to increase the accuracy of speech recognition.

14 Claims, 2 Drawing Sheets

(56) References Cited

U.S. PATENT DOCUMENTS

2015/0058018 A1* 2/2015 Georges .................. G10L 15/08
704/257
2015/0287405 A1* 10/2015 Biadsy .................. G10L 15/063
704/257

OTHER PUBLICATIONS

Aggarwal et al "Integrationof Multiple acoustic and language models for improved Hindi speech recognition system" Int. J. Speech Technol. Feb. 2012.*

* cited by examiner

METHOD AND APPARATUS FOR AN EXEMPLARY AUTOMATIC SPEECH RECOGNITION SYSTEM

CLAIM OF PRIORITY

This patent application claims priority from U.S. Provisional Patent Application No. 61/825,516, filed on May 20, 2013, in the U.S. Patent and Trademark Office, the disclosure of which is incorporated herein by reference in its entirety.

BACKGROUND

1. Field

Embodiments herein relate to a method and apparatus for exemplary speech recognition.

2. Description of Related Art

Typically speech recognition is accomplished through the use of a single Automatic Speech Recognition (ASR) engine. An ASR works by obtaining a phrase of one or more words, making several potential representations of said phrase and assigning a confidence score each representation. A confidence score is provided by most ASRs and presents a numerical representation of the quality of the representation, i.e. the higher the confidence score, the likelihood that the representation result is accurate.

SUMMARY

Embodiments of the present application relate to speech recognition using multiple ASRs working in tandem to render the best possible representation. For each phrase translated, the speech recognition selects the phrase with the highest confidence score between the various ASRs.

DETAILED DESCRIPTION OF THE EMBODIMENTS

Figure 1:
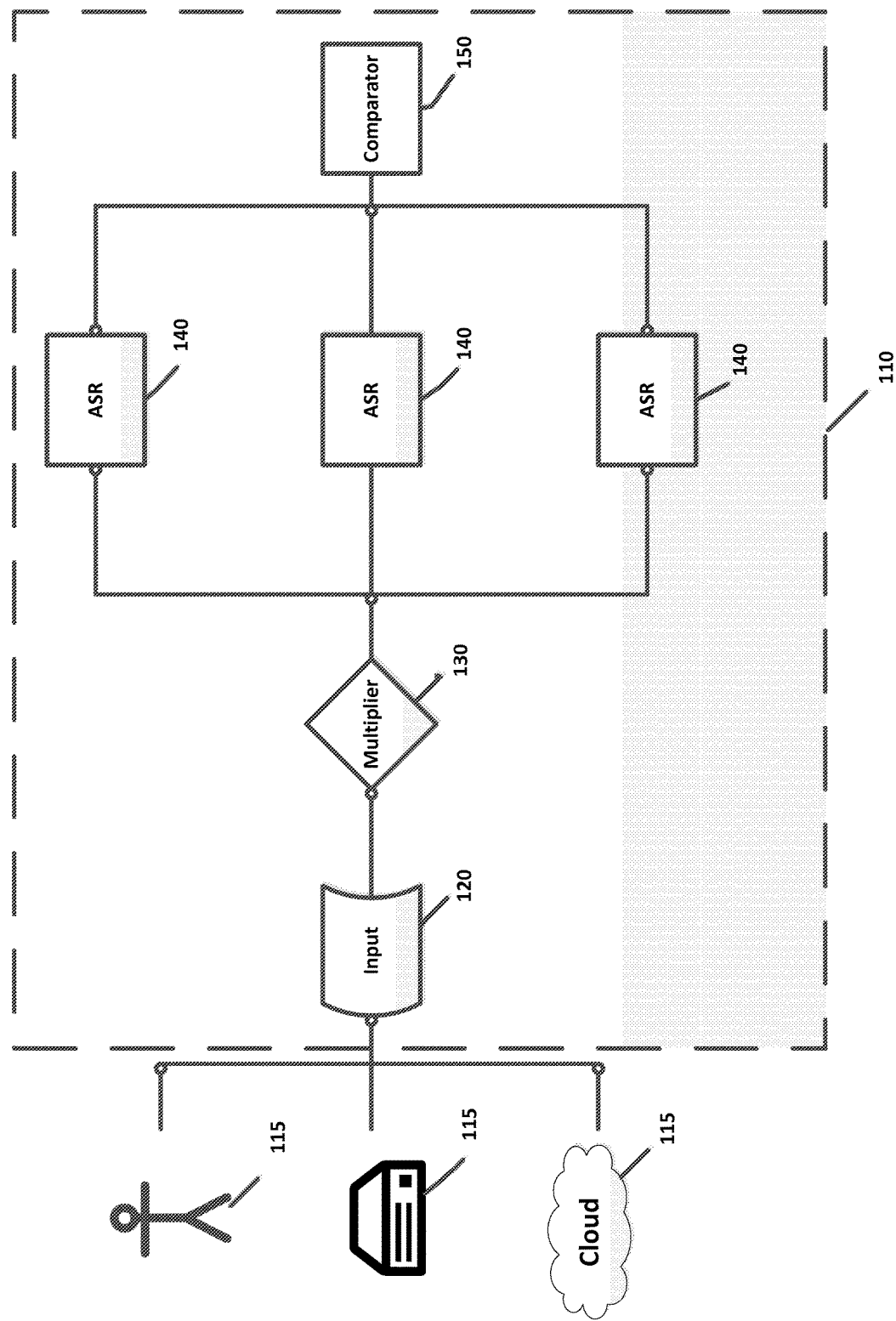
FIG. 1 illustrates a system level diagram of the computer system

FIG. 1 illustrates a block diagram of a system for enhancing the accuracy of speech recognition according to an exemplary embodiment.

The speech recognition system in FIG. 1 may be implemented as a computer system 110; a computer comprising several modules, i.e. computer components embodied as either software modules, hardware modules, or a combination of software and hardware modules, whether separate or integrated, working together to form an exemplary computer system. The computer components may be implemented as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Input 120 is a module configured to receive human speech from an audio source 115, and output the input speech to Multiplier 130. The audio source 115 may be live person speaking into a microphone, recorded speech, for example speech recorded in a file, synthesized speech, etc.

Multiplier 130 is a module configured to receive human speech from Input 120 and routes said input speech to a first and second automatic speech recognizer (collectively "ASR 140"), in parallel, where said first and second ASR's have different language and/or acoustic models. Multiplier 130 may be software modules, hardware modules, or a combination of software and hardware modules, whether separate or integrated, working together to perform said function ASR 140 may be software modules, hardware modules, or a combination of software and hardware modules, whether separate or integrated, working together to perform automatic speech recognition. In a preferred embodiment, each ASR 140 is configured to receive an input speech phrase, produce a speech wave form, embodying the words of the phrase, the extraneous sounds, and pauses in the spoken input. It then decodes the speech into the best estimate of the phrase by first converting the input speech signal into a sequence of vectors, which are measured throughout the duration of the speech signal. Then, using a syntactic decoder it generates one or more valid sequences of representations, assign a confidence score to each potential representation, select the potential representation with the highest confidence score, and output said representation as well as the confidence score for said selected representation.

Computer System 110 uses multiple ASRs 140, each optimized for a different input speaker, e.g. language, accent, cadence, etc. to obtain the best potential representation of the input speech. ASR 140 is configured with a language model and an acoustic model. The way that words are connected together into phrases is governed by knowledge of the phrases that are to be accepted by the recognizer; the language model defines this set of phrases or at least defines the likelihood of one word following another. For example, in US English, "the" is almost always immediately followed by a noun or an adjective. Thus, in making a decision between the phrases "the scene" and "the seen", the ASR is likely to determine a higher confidence score for "the scene" over "the seen" as "seen" is neither a noun nor adjective.

Similarly, acoustic modeling of speech typically refers to the process of establishing statistical representations for the feature vector sequences computed from the speech waveform. Acoustic modeling also encompasses "pronunciation modeling", which describes how a sequence or multi-sequences of fundamental speech units (such as phones or phonetic feature) are used to represent larger speech units such as words or phrases which are the object of speech recognition.

Accordingly, depending on the likely speaker, different ASRs with specific optimization are employed for speech recognition. For example, there are ASRs which are optimized for a particular type of speech such as the highly specialized speech typically found in the medical or legal fields. Both fields have unique vocabularies including many words which are not found in typical everyday speech. Consequently, whereas a general purpose ASR would be less likely to select such technical jargon, an ASR optimized for a specific industry would be more likely to select an industry specific word. Similarly, an ASR can have an acoustic model which is optimized for a specific regional dialect.

Additionally, there are limited-vocabulary ASRs, also known as restricted domain ASRs. These ASRs have been programmed to accept only certain words. An example of a limited vocabulary ASR would be the automatic phone tree used by many large businesses.

The difficulty with the traditional ASR is that at different times, the speaker may have different needs. For example, a physician may need an ASR optimized for medical usage during the day time as he or she works with patients. The same physician may need a general purpose ASR after hours.

Computer System 110 employs ASR's with different language or acoustic models. For example one ASR might have a standard US English language model and a US Cajun English acoustic model; another with a standard US English language and a US Boston English acoustic model, similarly, another ASR could have a US Cajun English language model and a US Cajun Acoustic model.

For example, upon receiving the phrase "N'awlins" from a US Cajun English speaker an ASR with a US Cajun English Language model and US Cajun acoustic model might output "New Orleans". An ASR with an US English language model and acoustic model would probably fail.

In another embodiment of the invention, ASR 140 is a single ASR with multiple language and acoustic models each operating in parallel, each generating a potentially different representation of the input speech, In another embodiment of the invention, the invention adds a pre-processor to determine the language of the input speaker and only those ASRs using the same language process the input speech. This addresses the problem of false friends. For purposes of this disclosure, a false friend is a word in a language that sounds similar to a word in another language but means something different. Examples of false friends include French "carte" and English "cart" or German "aktuell") and English "actual". ASR's with different foreign language model might present similar confidence scores potentially resulting in the wrong word being chosen.

Computer system 110 includes as many different ASRs or as many language model and acoustic models as possible, limited by among other things physical space, power and heating requirements, and computer hardware memory.

Comparator 150 is a computer hardware module configured to obtain the confidence score from each ASR, and select the representation with the highest confidence score. The confidence score produced by each ASR may be unique to the manufacturer. Accordingly, computer system 110 normalizes the confidence score to ensure accurate comparisons. In one embodiment, computer system 110 scales the confidence score to a percentage representation, i.e. divide the confidence score by the range of confidence scores, much in the way one scales between the English system and the metric system.

Figure 2:
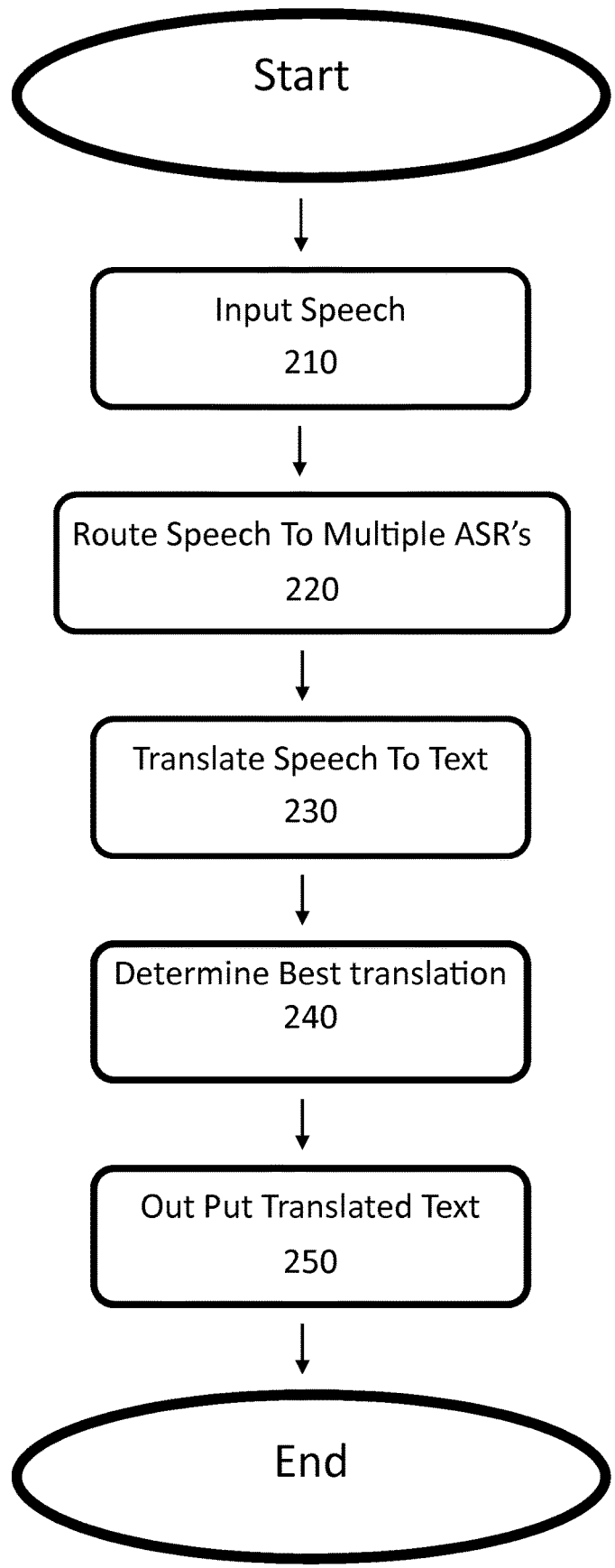
FIG. 2 illustrates a flow diagram one of the several embodiments.

FIG. 2 illustrates a flow diagram of one embodiment of the invention. At step 210, the computer system obtains human speech. At step 220, the speech is routed to two or more ASRs to be translated into text. At step 230, each ASR translates the human speech into text at the phrase level and determines a confidence score. For each translated phrase, at step 240, the computer system selects the representation with the highest confidence score. At step 250, the selected text is output.

I claim:

1. An automatic speech recognition system comprising:
an input interface configured to receive input speech;
a pre-processor configured to determine a language of the input speech and, based on the language of the input speech, select from among a plurality of automatic speech recognition engines configured to recognize speech of different languages, only those automatic speech recognition engines configured to recognize the language of the input speech including:
a first automatic speech recognition (ASR) engine configured to translate the input speech of the language into text according to a first language model, and output first translated text that is translated from the input speech according to the first language model and a first confidence score indicating a degree of accuracy of translating the input speech into the first translated text according to the first language model;
a second ASR engine configured to translate the input speech of the language into text according to a second language model, and output second translated text that is translated from the input speech according to the second language model and a second confidence score indicating a degree of accuracy of translating the input speech into the second translated text according to the second language model; and
a comparator configured to compare the first confidence score and the second confidence score, and output a most accurate representation of the input speech from among the first translated text and the second translated text based on a result of the comparison,
wherein the first language model is different from the second language model.

2. The automatic speech recognition system of claim 1, wherein the first ASR engine is further configured to translate the input speech of the language into the first translated text according to the first language model and a first acoustic model,
wherein the second ASR engine is further configured to translate the input speech of the language into the second translated text according to the second language model and a second acoustic model, and
wherein the first acoustic model is different from the second acoustic model.

3. The automatic speech recognition system of claim 2, wherein the first acoustic model is a first process of establishing a statistical representation for feature vector sequences computed from a speech waveform of the input speech, and
wherein the second acoustic model is a second process of establishing a statistical representation for feature vector sequences computed from a speech waveform of the input speech different from the first process.

4. The automatic speech recognition system of claim 3, wherein the first process comprises first pronunciation modeling configured to describe how at least one sequence of fundamental speech units of the input speech is used to represent at least one word or phrase that is an object of speech recognition, and
wherein the second process comprises second pronunciation modeling configured to describe how at least one sequence of fundamental speech units of the input speech is used to represent at least one word or phrase that is an object of speech recognition different from the second pronunciation modeling.

5. The automatic speech recognition system of claim 1, wherein the first ASR engine is further configured to translate the input speech of the language into the first translated text according to the first language model and a first acoustic model,
    wherein the second ASR engine is further configured to translate the input speech of the language into the second translated text according to the second language model and a second acoustic model, and
    wherein the first acoustic model is the same as the second acoustic model.

6. The automatic speech recognition system of claim 5, wherein the first acoustic model and the second acoustic model are a processes of establishing a statistical representation for feature vector sequences computed from a speech waveform of the input speech.

7. The automatic speech recognition system of claim 6, wherein the processes comprise pronunciation modeling configured to describe how at least one sequence of fundamental speech units of the input speech is used to represent at least one word or phrase that is an object of speech recognition.

8. The automatic speech recognition system of claim 1, wherein the first language model defines a first relationship of ordering among words in phrases of the language, and
    wherein the second language model defines a second relationship of ordering among words in phrases of the language.

9. An automatic speech recognition system comprising:
    an input interface configured to receive input speech;
        a pre-processor configured to determine a language of the input speech and, based on the language of the input speech, select from among a plurality of automatic speech recognition engines configured to recognize speech of different languages, only those automatic speech recognition engines configured to recognize the language of the input speech including:
            a first automatic speech recognition (ASR) engine configured to translate the input speech of the language into text according to a first acoustic model, and output first translated text that is translated from the input speech according to the first acoustic model and a first confidence score indicating a degree of accuracy of translating the input speech into the first translated text according to the first acoustic model;
            a second ASR engine configured to translate the input speech of the language into text according to a second acoustic model, and output second translated text that is translated from the input speech according to the second acoustic model and a second confidence score indicating a degree of accuracy of translating the input speech into the second translated text according to the second acoustic model; and
        a comparator configured to compare the first confidence score and the second confidence score, and output a most accurate representation of the input speech from among the first translated text and the second translated text based on a result of the comparison,
    wherein the first acoustic model is different from the second acoustic model.

10. The automatic speech recognition system of claim 9, wherein the first ASR engine is further configured to translate the input speech of the language into the first translated text according to the first acoustic model and a first language model,
    wherein the second ASR engine is further configured to translate the input speech of the language into the second translated text according to the second acoustic model and a second language model, and
    wherein the first language model is different from the second language model.

11. The automatic speech recognition system of claim 10, wherein the first acoustic model is a first process of establishing a statistical representation for feature vector sequences computed from a speech waveform of the input speech, and
    wherein the second acoustic model is a second process of establishing a statistical representation for feature vector sequences computed from a speech waveform of the input speech different from the first process.

12. The automatic speech recognition system of claim 11, wherein the first process comprises first pronunciation modeling configured to describe how at least one sequence of fundamental speech units of the input speech is used to represent at least one word or phrase that is an object of speech recognition, and
    wherein the second process comprises second pronunciation modeling configured to describe how at least one sequence of fundamental speech units of the input speech is used to represent at least one word or phrase that is an object of speech recognition different from the second pronunciation modeling.

13. The automatic speech recognition system of claim 10, wherein the first language model defines a first relationship of ordering among words in phrases of the language, and
    wherein the second language model defines a second relationship of ordering among words in phrases of the language.

14. The automatic speech recognition system of claim 9, wherein the first ASR engine is further configured to translate the input speech of the language into the first translated text according to the first acoustic model and a first language model,
    wherein the second ASR engine is further configured to translate the input speech of the language into the second translated text according to the second acoustic model and a second language model, and
    wherein the first language model is the same as the second language model.

* * * * *